(12) United States Patent
Kang et al.

(10) Patent No.: US 8,420,260 B2
(45) Date of Patent: Apr. 16, 2013

(54) BINDER FOR SECONDARY BATTERY EXHIBITING EXCELLENT ADHESIVE FORCE

(75) Inventors: MinAh Kang, Daejeon (KR); Young-Min Kim, Daejeon (KR); Oksun Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/389,806

(22) PCT Filed: Jul. 7, 2010

(86) PCT No.: PCT/KR2010/004410
§ 371 (c)(1),
(2), (4) Date: Apr. 3, 2012

(87) PCT Pub. No.: WO2011/019142
PCT Pub. Date: Feb. 17, 2011

(65) Prior Publication Data
US 2012/0189911 A1    Jul. 26, 2012

(30) Foreign Application Priority Data
Aug. 14, 2009 (KR) .................. 10-2009-0075244

(51) Int. Cl.
*H01M 4/13* (2010.01)
*H01M 4/62* (2006.01)
(52) U.S. Cl.
USPC ......................................... 429/217; 429/209
(58) Field of Classification Search .......... 429/209, 429/212, 213–215, 217; 522/182.1
See application file for complete search history.

(56) References Cited

U.S. PATENT DOCUMENTS

| | | | |
|---|---|---|---|
| 6,756,153 B1 | 6/2004 | Yamamoto et al. | |
| 6,770,397 B1 * | 8/2004 | Maeda et al. | 429/217 |
| 2003/0113626 A1 * | 6/2003 | Maeda et al. | 429/217 |
| 2006/0115717 A1 * | 6/2006 | Schubert et al. | 429/124 |
| 2006/0235141 A1 * | 10/2006 | Riegel et al. | 524/556 |
| 2007/0087267 A1 * | 4/2007 | Kim et al. | 429/217 |
| 2010/0316903 A1 | 12/2010 | Kim et al. | |

FOREIGN PATENT DOCUMENTS

| | | |
|---|---|---|
| EP | 1244158 A1 | 9/2002 |
| KR | 10-0491026 B1 | 5/2005 |
| KR | 10-0711975 B1 | 5/2007 |
| KR | 10-0743451 B1 | 7/2007 |
| KR | 10-2008-0034218 A | 4/2008 |
| KR | 10-2008-0062966 A | 7/2008 |
| KR | 10-2009-0056811 A | 6/2009 |
| KR | 10-2011-009811 A | 1/2011 |

OTHER PUBLICATIONS

International Search Report issued in PCT/KR2010/004410, dated Feb. 25, 2011.
Extended European Search Report for Appl. No. 10808291.8 dated Jan. 7, 2013.

* cited by examiner

*Primary Examiner* — Carlos Barcena
(74) *Attorney, Agent, or Firm* — Birch, Stewart, Kolasch & Birch, LLP

(57) ABSTRACT

The present invention relates to a binder for an electrode of a secondary battery, including polymer particles in which two or more types of monomers are polymerized with two or more types of cross-linking agents with mutually different molecular weights. The binder, through which the combination of the specific ingredients above, fundamentally improves electrode stability, starting from the manufacturing process of an electrode, to thereby provide a secondary battery with excellent cycle characteristics.

13 Claims, No Drawings

BINDER FOR SECONDARY BATTERY EXHIBITING EXCELLENT ADHESIVE FORCE

TECHNICAL FIELD

The present invention relates to a binder for an electrode of a secondary battery, more particularly, to a novel binder for an electrode of a secondary battery, including polymer particles wherein two types or more of monomers are polymerized with two types or more of cross-linking agents having different molecular weights.

BACKGROUND ART

A rapid increase in use of fossil fuels has led to an increase in the demand for alternative energy or clean energy. As a part of such demand, most actively investigated fields are power generation/storage applications based on electrochemistry.

At present, a representative example of electrochemical devices using the foregoing electrochemical energy may be a secondary battery, and the application range thereof continues to expand.

In recent years, increased technological development and demand for mobile equipment such as a portable (laptop) computer, a mobile phone, a camera, etc. have led to a rapid increase in the demand for secondary batteries as an energy source. Among these secondary batteries, lithium secondary batteries having high energy density and operational (output) voltage, long cycle life and low self-discharge ratio are extensively studied, commercially available and widely used.

In addition, increased concern over environmental issues has brought about a great deal of research associated with electric vehicles (EV) and hybrid electric vehicles (HEV) as substitutes for vehicles using fossil fuels, such as gasoline vehicles and diesel vehicles, which are a major cause of air pollution. Although nickel metal hydride (NiMH) secondary batteries have generally been used as a power source of such EVs and/or HEVs, a great deal of studies into use of lithium secondary batteries having high energy density and high discharge voltage are underway and some of these are commercially available.

A typical lithium ion secondary battery uses graphite as an anode active material, wherein lithium ions in a cathode are inserted into and detached from the anode, thus repeating a charging and discharging process. Although the theoretical capacity of a battery may be varied according to kinds of electrode active materials, it is generally known that charge-discharge capacity is deteriorated as (charge-discharge) cycles are repeated.

The major reason behind such a problem is considered to be that electrode active materials are mutually separated or an electrode active material is isolated from a current collector, due to variation in volume of an electrode caused by repeatedly charging and discharging a battery over time, and the active material does not fully function. In addition, due to lithium ions entering the anode during insertion and detachment completely escaped therefrom, an active point of the anode is lowered which in turn may deteriorate charge-discharge capacity and lifespan while the cycles are repeated.

Especially, in order to increase discharge capacity, in the case where some materials such as silicon, tin or a silicon-tin alloy, are combined with natural graphite having the theoretical discharge capacity of 372 mAh/g for use, volume expansion of the material may be considerably increased during repeated charge and discharge. Due to this, an anode material is released from the electrode material and causes a problem of sharply deteriorating battery capacity over the course of repeated charge-discharge cycles.

Accordingly, studies for binders and/or electrode materials that have strong adhesiveness to prevent mutual separation of electrode active materials or separation of an electrode material from a current collector in the manufacture of an electrode, possess excellent physical properties to control volume expansion of the electrode active material occurring during repeated charge-discharge, to thereby contribute to a structural stability of the electrode as well as improvement of battery performance, are strongly required in the related art.

Since the existing solvent binder, i.e., polyvinylidene fluoride (PVdF) does not satisfy the above requirements, a method of preparing emulsified particles by polymerization of styrene-butadiene rubber (SBR) in an aqueous phase and mixing the prepared particles with a neutralizing agent and using the same has recently been proposed and becomes commercially available. Such a binder has advantages of being eco-friendly and reducing the content of the binder to increase battery capacity. However, although adhesion durability may be improved by elasticity of a rubber fraction, adhesiveness is not remarkably superior.

Therefore, there is still a strong need for development of a novel binder capable of providing structural stability to an electrode while improving cycle characteristics of a battery, as well as having excellent adhesiveness.

DISCLOSURE

Technical Problem

Therefore, the present invention is directed to solving conventional problems described above and to overcoming technical restrictions in the related art.

As a result of extensive studies and experiments executed by the present inventors, a binder for an electrode of a secondary batter, which includes polymer particles formed by polymerization of two types or more of monomers with two types or more of cross-linking agents having different molecular weights, as described below, has been developed. Also, it was found that using the developed binder may increase adhesiveness while contributing to improvement in cycle characteristics of a battery, thereby, the present invention was completed.

Technical Solution

In accordance with one aspect of the present invention, provided is a method for manufacturing a front electrode for solar cells, In order to accomplish the above object of the present invention, there is provided a binder for an electrode of a secondary battery including polymer particles formed by polymerization of two types or more of monomers with two types or more of cross-linking agents having different molecular weights.

In the binder of the present invention, the cross-linking agent having a small molecular weight may increase physical properties of the binder to contribute to improvement in cycle characteristics while the cross-linking agent having a relatively larger molecular weight may increase flexibility of the binder, in turn enhancing adhesiveness.

According to one preferred embodiment, the two types or more of monomers may be a mixture of; (a) a (meth)acrylic acid ester monomer, (b) at least one monomer selected from a group consisting of an acrylate monomer, a vinyl monomer and a nitrile monomer. Such a preferable combination may impart favorable binding properties and improved binding durability.

With regard to the foregoing configuration, the monomer in Group (a) descried above, i.e., the (meth)acrylic acid ester monomer may be contained in an amount of 10 to 99 wt. % while the monomer in Group (b) described above may be included in an amount of 1 to 60 wt. %, relative to a total weight of the monomer. However, the above content ranges are not fixed and may be suitably altered on the basis of characteristics of each monomer and/or desired physical properties of the binder.

The (meth)acrylic acid ester monomer may be at least one monomer selected from a group consisting of, for example; methyl acrylate, ethyl acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, 2-hydroxyethyl acrylate, methylmethacrylate, ethylmethacrylate, propylmethacrylate, isopropylmethacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, hydroxyethyl methacrylate and hydroxypropyl methacrylate.

The acrylate monomer may be at least one monomer selected from a group consisting of, for example; methacryloxy ethylethyleneurea, β-carboxy ethylacrylate, aliphatic monoacrylate, dipropylene diacrylate, ditrimethylpropane tetraacrylate, hydroxyethyl acrylate, dipentaerythriol hexaacrylate, pentaerythriol triacrylate, pentaerythriol tetraacrylate, lauryl acrylate, ceryl acrylate, stearyl acrylate, lauryl methacrylate, cetyl methacrylate and stearyl methacrylate.

The vinyl monomer may be at least one selected from a group consisting of styrene, α-methyl styrene, β-methyl styrene, para-tert-butyl styrene, divinyl styrene and mixtures thereof.

The nitrile monomer may include, for example; succinonitrile, sebaconitrile, nitrile fluoride, nitrile chloride, acrylonitrile, methacrylonitrile, etc. and, more preferably, at least one selected from a group consisting of acrylonitrile, methacrylate and mixtures thereof.

As described above, the inventive binder may include two types or more of the cross-linking agents having different molecular weights, in addition to two types or more of the monomers described above.

Among these, the cross-linking agent having a relatively smaller molecular weight preferably includes a (meth)acrylate compound or amine compound having a molecular weight of at least 50 to less than 250 and at least two double-bonds at the ends thereof.

The (meth)acrylate compound may include, for example, at least one compound selected from a group consisting of ethylene glycol dimethacrylate, 1,3-butandiol dimethacrylate, 1,6-hexandiol dimethacrylate, aryl methacrylate (AMA) and triaryl isocyanurate (TAIC).

The amine compound may be at least one compound selected from a group consisting of, for example, triallylamine (TAA) and diallylamine (DAA).

The cross-linking agent having a relatively large molecular weight may include a (meth)acrylate compound having an oxyalkylene group and at least two double-bonds at the ends thereof and a molecular weight of 250 to less than 5,0000.

The (meth)acrylate compound may be at least one compound selected from a group consisting of, for example, polyethylene glycol diacrylate, polypropylene glycol diacrylate and polybutylene glycol diacrylate.

A content ratio of cross-linking agents may range from 1:0.1 to 1:20 (ratio of a cross-linking agent having a smaller molecular weight to a cross-linking agent having a larger molecular weight) on a weight basis, and an amount thereof may range from 0.1 to 10 wt. %, relative to a total weight of the binder. If a content of the cross-linking agent having a smaller molecular weight is too low, cycle characteristics may not be improved. On the contrary, a content of the cross-linking agent having a larger molecular weight is too low, little improvement in flexibility of the binder may be expected. In addition, when the amount of the cross-linking agent is too small, volume variation of an electrode cannot be controlled during charge-discharge, in turn decreasing the percentage of cycle capacity maintained ('cycle capacity maintenance rate'). On the contrary, if the amount of the cross-linking agent is too large, it is difficult to impart high adhesiveness. More preferably, the content of the cross-linking agent ranges from 0.1 to 5 wt. % relative to a total weight of the binder.

Optionally, the binder may further include 1 to 20 wt. % of at least one monomer selected from a group consisting of a (meth)acrylamide monomer and an unsaturated mono-carboxylic acid monomer, relative to the total weight of the binder.

The binder of the present invention may be prepared by emulsion-polymerization using the foregoing monomers and cross-linking agents. Polymerization temperature and polymerization time may be suitably determined according to various polymerization methods and/or types of initiators used for polymerization. For instance, the polymerization temperature may range from about 50 to 200° C. and the polymerization time may range from about 1 to 20 hours.

Emulsifiers used for emulsion polymerization may include, for example: fatty acid salts, i.e., sodium or potassium salts of oleic acid, stearic acid, lauric acids, as representative examples thereof; general anionic emulsifiers such as rosin acid. Preferably, a reactive emulsifier improving stability of latex is also added. The foregoing emulsifiers may be used alone or in combination of two or more thereof.

As the polymerization initiator for emulsion polymerization, inorganic or organic peroxides may also be used. For instance, an aqueous (or water-soluble) initiator such as potassium persulfate, sodium persulfate, ammonium persulfate, etc. and/or a hydrophobic (or oil-soluble) initiator such as cumene hydroperoxide, benzoyl peroxide, etc. In addition to the polymerization initiator, an active agent may be further included to promote reaction of the peroxide in an early stage. Such an active agent may include at least one selected from a group consisting of sodium formaldehyde sulfoxylate, sodium ethylenediamine tetraacetate, ferrous sulfate and dextrose.

The present invention may also provide an electrode slurry comprising an electrode active material capable of absorbing and desorbing (or discharging) lithium as well as the binder for an electrode described above.

The slurry may include a solvent such as water, NMP, etc. and the electrode active material will be described in more detail below.

After applying the slurry to a current collector, drying and rolling the same may result in an electrode.

Accordingly, the present invention may provide an electrode for a secondary battery, including the slurry applied to the current collector. The electrode for a secondary battery may be a cathode or an anode.

The cathode may be fabricated by, for example, applying a mixture of a cathode active material, a conductive material and a binder to a cathode current collector, followed by drying the mixture. Likewise, the anode may be fabricated by applying a mixture of an anode active material, a conductive material and a binder to an anode current collector and then drying the same.

The electrode active material in the electrode may be a material capable of undergoing electro-chemical reaction and, according to types of the electrode, classified into an anode active material and a cathode active material.

The cathode active material may comprise a lithium transition metal oxide, which contains two or more transition metals, for example; a lamellar compound such as lithium cobalt oxide ($LiCoO_2$), lithium nickel oxide ($LiNiO_2$), etc. which is substituted with one or more transition metals; lithium manganese oxide substituted with one or more transition metals; lithium nickel oxide represented by $LiNi_{1-y}M_yO_2$ (wherein M=Co, Mn, Al, Cu, Fe, Mg, B, Cr, Zn or Ga, the oxide contains at least one of these elements, and y satisfies $0.01 \leq y \leq 0.7$); lithium nickel cobalt manganese composite oxide represented by $Li_{1+z}Ni_bMn_cCo_{1-(b+c+d)}M_dO_{(2-e)}A_c$ (wherein $-0.5 \leq z \leq 0.5, 0.1 \leq b \leq 0.8, 0.1 \leq c \leq 0.8, 0 \leq d \leq 0.2, 0 \leq e \leq 0.2, b+c+d<1$, M=Al, Mg, Cr, Ti, Si or Y, and A=F, P or Cl), and so forth, without being particularly limited thereto.

Examples of the anode active material may include: carbon and graphite materials such as natural graphite, artificial graphite, expanded graphite, carbon fiber, non-graphitizing carbon (often referred to as 'hard carbon'), carbon black, carbon nanotubes, fullerene, activated carbon, etc.; metals alloyable with lithium, such as Al, Si, Sn, Ag, Bi, Mg, Zn, In, Ge, Pb, Pd, Pt, Ti, etc., as well as compounds containing the same; combination of carbon and graphite materials with metals and compounds thereof; lithium containing nitrides, and so forth. Among these, carbon active materials, silicon active materials, tin active materials or silicon-carbon active materials are preferably used and these materials may be used alone or in combination of two or more thereof.

The conductive material is generally used to enhance conductivity of the electrode active material and may be added in an amount of 0.01 to 30 wt. % relative to a total weight of the electrode mix. Such conductive material is not particularly restricted so long as it has conductive properties without causing chemical modification of the battery. The conductive material may include, for example: graphite such as natural graphite or artificial graphite; carbon black such as carbon black, acetylene black, ketchen black, channel black, furnace black, lamp black, summer black, etc.; conductive fibers such as carbon fiber or metal fiber; metal powder such as carbon fluoride, aluminum, nickel powder, etc.; conductive whiskers such as zinc oxide, potassium titanate, etc.; conductive metal oxides such as titanium oxide; conductive substances such as polyphenylene derivatives, and the like.

The current collector is a part to which electrons migrate while the active material undergoes electrochemical reaction and may include an anode collector and a cathode collector.

The cathode current collector generally has a thickness in the range of 3 to 500 μm. Such a cathode current collector is not particularly restricted so long as it has high conductivity without causing chemical modification of a cell. For example, the cathode current collector may be fabricated using stainless steel, aluminum, nickel, titanium, calcined carbon, or stainless steel or aluminum surface-treated with carbon, nickel, titanium or silver, and the like.

The anode current collector is generally fabricated to have a thickness in the range of 3 to 500 μm. Such an anode current collector is not particularly restricted so long as it has favorable conductivity without causing chemical modification of a battery. For example, the anode current collector may be fabricated using copper, stainless steel, aluminum, nickel, titanium, calcined carbon, copper or stainless steel surface-treated with carbon, nickel, titanium or silver, an aluminum-cadmium alloy, and so forth.

Such current collectors may be processed to have fine irregularities on the surface thereof, so as to reinforce adhesiveness to an electrode active material. In addition, these collectors may have various forms including films, sheets, foils, nets, porous structures, foams, non-woven fabrics, etc.

Further, at least one selected from a group consisting of a viscosity modifier and a filler may be added to the mixture (that is, the cathode mix) including the cathode active material, the conductive material and the binder.

A viscosity modifier serves to control viscosity of an electrode mix in order to facilitate mixing of electrode materials and application thereof to a current collector, and may be added in an amount of 30 wt. % or less, relative to a total weight of the electrode mix. Examples of the viscosity modifier may include, but are not limited to, carboxymethyl cellulose, polyvinylidene fluoride, etc. Optionally, a solvent may also serve as the viscosity modifier.

The filler is a supplementary ingredient to inhibit electrode expansion, is optionally used and is not particularly restricted so long as it comprises fibrous materials without causing chemical modification of the battery. The filler may include, for example, olefin polymers such as polyethylene, polypropylene, etc., fibrous materials such as glass fiber or carbon fiber, and so forth.

The present invention also provides a lithium secondary battery including the electrode for a secondary battery described above.

Such a lithium secondary battery may generally include a separator and a non-aqueous electrolyte containing lithium salts, in addition to the electrode.

The separator used herein is interposed between the cathode and the anode and may be formed using a thin insulation film having a high ion permeability and excellent mechanical strength. The separator typically has a pore diameter of 0.01 to 10 μm and a thickness of 5 to 300 μm. As the separator, a sheet or non-woven fabric made of an olefin polymer such as polypropylene and/or glass fibers or polyethylene, which have chemical resistance and hydrophobicity, are used. When a solid electrolyte comprising a polymer is employed as the electrolyte, the solid electrolyte may also serve as the separator.

The non-aqueous electrolyte containing lithium salt used herein comprises a lithium salt as well as a non-aqueous electrolyte.

The non-aqueous organic solvent may be an aprotic organic solvent including, for example: N-methyl-2-pyrrolidinone; propylene carbonate; ethylene carbonate; butylene carbonate; dimethyl carbonate; diethyl carbonate; γ-butyrolactone; 1,2-dimethoxyethane; tetrahydroxyfuran; 2-methyl tetrahydrofuran; dimethyl sulfoxide; 1,3-dioxolane; formamide; dimethyl formamide; dioxolane; acetonitrile; nitromethane; methyl formate; methyl acetate; phosphoric triester; trimethoxymethane; dioxolane derivatives; sulfolane; methyl sulfolane; 1,3-dimethyl-2-imidazolidinone; propylene carbonate derivatives; tetrahydrofuran derivatives; ether; methyl propionate; ethyl propionate, or the like.

The lithium salt used herein is a material readily dissolved in the non-aqueous electrolyte and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, low aliphatic carboxylic lithium, lithium 4-phenyl borate, imides, or the like.

Optionally, an organic solid electrolyte and/or an inorganic solid electrolyte may also be included.

Examples of the organic solid electrolyte may include polyethylene derivatives, polyethylene oxide derivatives, polypropylene oxide derivatives, phosphoric ester polymers, poly agitation lysine, polyester sulfide, polyvinyl alcohol, polyvinylidene fluoride, polymers having ionic dissociation groups, or the like.

Examples of the inorganic solid electrolyte may include nitrides, halides and/or sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$NiOH$, $Li_3PO_4$—$Li_2S$—$SiS_2$, etc.

Additionally, in order to improve charge-discharge properties and impart flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like, may be added to the non-aqueous electrolyte. If necessary, in order to impart non-flammability, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas. Alternatively, fluoro-ethylene carbonate (FEC), propene sulfone (PRS), or the like may also be included.

The secondary battery fabricated according to the present invention may be employed as a unit cell of a battery module, which is a power source for medium and/or large-scale devices requiring high temperature safety, long cycle life properties, high rate properties, or the like.

ADVANTAGEOUS EFFECTS

As apparent from the foregoing, the binder for an electrode of a secondary battery according to the present invention includes polymer particles formed by polymerization of two types or more of monomers with two types or more of cross-linking agents having different molecular weights, to thereby afford enhanced cycle characteristics and high adhesiveness.

BEST MODE

Hereinafter, exemplary embodiments of the present invention will be described in greater detail with reference to the following examples. However, those skilled in the art will appreciate that these embodiments are proposed for illustrative purpose and do not restrict the scope of the present invention.

EXAMPLE 1

60 g of butyl acrylate and 30 g of styrene as monomers; and 0.5 g of ethyleneglycol dimethacrylate and 0.5 g of polyethyleneglycol diacrylate having a molecular weight of 800 as cross-linking agents were added to water containing sodium lauryl sulfate as an emulsifier and potassium persulfate as a polymerization initiator, followed by mixing and conducting polymerization thereof at 70° C. for about 5 hours. Through polymerization, a binder for an electrode of a secondary battery including polymer particles formed of the polymerized monomers and cross-linking agents was obtained.

EXAMPLE 2

A binder for an electrode of a secondary battery was prepared according to the same procedure as described in Example 1, except that butyl acrylate was replaced with 2-ethylhexyl acrylate as the monomer.

EXAMPLE 3

A binder for an electrode of a secondary battery was prepared according to the same procedure as described in Example 1, except that styrene was replaced with nitrile as the monomer.

EXAMPLE 4

A binder for an electrode of a secondary battery was prepared according to the same procedure as described in Example 1, except that the content of butyl acrylate was changed to 80 g and the content of styrene was changed to 10 g.

EXAMPLE 5

A binder for an electrode of a secondary battery was prepared according to the same procedure as described in Example 1, except that the content of ethylene glycol dimethacrylate was changed to 0.3 g and the content of polyethylene glycol diacrylate was changed to 0.3 g.

EXAMPLE 6

A binder for an electrode of a secondary battery was prepared according to the same procedure as described in Example 1, except that the content of ethylene glycol dimethacrylate was changed to 0.1 g and the content of polyethylene glycol diacrylate was changed to 1.0 g (ratio by weight=1:10)

COMPARATIVE EXAMPLE 1

A binder for an electrode of a secondary battery was prepared according to the same procedure as described in Example 1, except that 60 g of butyl acrylate and 30 g of ethyl acrylate were used as the monomers.

COMPARATIVE EXAMPLE 2

A binder for an electrode of a secondary battery was prepared according to the same procedure as described in Example 1, except that 60 g of styrene and 30 g of acrylonitrile were used as the monomers.

COMPARATIVE EXAMPLE 3

A binder for an electrode of a secondary battery was prepared according to the same procedure as described in Example 1, except that 1 g of ethylene glycol dimethacrylate was used as the cross-linking agent.

COMPARATIVE EXAMPLE 4

A binder for an electrode of a secondary battery was prepared according to the same procedure as described in Example 1, except that 1 g of polyethylene glycol diacrylate was used as the cross-linking agent.

COMPARATIVE EXAMPLE 5

A binder for an electrode of a secondary battery was prepared according to the same procedure as described in Example 1, except that 6 g of ethylene glycol diacrylate and 6 g of polyethylene glycol diacrylate were used as the cross-linking agent.

EXPERIMENTAL EXAMPLE 1

Adhesiveness Test

Using the polymer binder of the present invention as a binder for a cathode of a lithium secondary battery, adhesion between an electrode active material and a current collector was measured.

First, each of the binders prepared in Examples 1 to 6 and the binders prepared in Comparative Examples 1 to 5, respectively, was mixed with other ingredients, in particular, in a relative ratio of an active material, a conductive material, a viscosity modifier and the binder of 92:5:1:2, to thereby prepare a slurry. Then the slurry was applied to an Al foil to form an electrode.

After cutting the surface of the formed electrode and fixing the cut piece on a glass slide, 180° stripping strength was measured while stripping a current collector from the cut piece and results thereof are shown in the following Table 1. Assessment was performed by measuring the stripping strength five times or more and calculating an average thereof

TABLE 1

|  | Adhesion force (g) |
| --- | --- |
| Example 1 | 32 |
| Example 2 | 36 |
| Example 3 | 28 |
| Example 4 | 35 |
| Example 5 | 27 |
| Example 6 | 36 |
| Comparative Example 1 | 16 |
| Comparative Example 2 | 12 |
| Comparative Example 3 | 18 |
| Comparative Example 4 | 30 |
| Comparative Example 5 | 5 |

As listed in the above Table 1, all electrodes comprising the binders prepared in Examples 1 to 6 of the present invention exhibited superior adhesiveness, compared to the electrodes using the binders prepared in Comparative Examples 1 to 3 and 5. Meanwhile, since the binder prepared in Comparative Example 4 was polymerized using only the cross-linking agent having a large molecular weight, it increased the flexibility of an electrode to thus show high adhesiveness. However, as stipulated in the following Experimental Example 2, cycle characteristics are considerably deteriorated which in turn causes a problem in using the foregoing as a binder having excellent stability.

EXPERIMENTAL EXAMPLE 2

Test of Cycle Characteristics

Using each of the electrodes formed in Experimental Example 1 as a cathode and Li metal as an anode, as well as an electrolyte of 1M $LiPF_6$ in a solvent comprising EC:DMC:DEC in a ratio of 1:2:1, a coin type battery was fabricated.

Each of the fabricated coil type batteries was subjected to a test of variation in charge-discharge characteristics. By 0.2 C charging and 0.2 C discharging the fabricated battery, a first cycle discharge capacity and efficiency were obtained. 50 charge-discharge cycles with 1 C charge and 1 C discharge were repeated and a capacity maintenance rate (%) at a $50^{th}$ cycle relative to initial capacity was measured. Results thereof are shown in the following Table 2.

TABLE 2

|  | $1^{st}$ cycle discharge capacity (mAh/g) | $1^{ST}$ cycle efficiency (%) | $50^{th}$ cycle efficiency (%) |
| --- | --- | --- | --- |
| Example 1 | 125 | 99 | 95 |
| Example 2 | 124 | 98 | 94 |
| Example 3 | 123 | 99 | 96 |
| Example 4 | 124 | 98 | 93 |
| Example 5 | 123 | 99 | 94 |
| Example 6 | 125 | 98 | 92 |
| Comparative Example 1 | 122 | 97 | 85 |
| Comparative Example 2 | 119 | 93 | 80 |
| Comparative Example 3 | 123 | 98 | 92 |
| Comparative Example 4 | 124 | 98 | 83 |
| Comparative Example 5 | 114 | 93 | 81 |

As listed in the above Table 2, the batteries using the binders of the present invention prepared in Examples 1 to 6 exhibited at least 90% of initial capacity even after 50 cycles. The reason behind such results is considered to be that high adhesiveness of the inventive binder may inhibit volume change of the electrode active material during charge-discharge, so as to greatly control interface variation between active materials, thereby reducing an increase in resistance while preventing detachment of the active material because of excellent adhesion between the active material and a current collector.

On the other hand, the batteries using the binders prepared in Comparative Examples 1, 2 and 4 did not endure such a great volume change, in turn considerably decreasing capacity. Meanwhile, since the battery in Comparative Example 3 used the binder which contains only the cross-linking agent having a small molecular weight, it had high physical properties and exhibited a capacity maintenance rate of at least 90%. However, the electrode exhibited deteriorated adhesiveness and often short-circuited during manufacture, therefore, it was found that stability is decreased in the process of manufacturing the same. Furthermore, the battery in Comparative Example 5 contained excess cross-linking agent, compared to the content of monomer, in turn inhibiting impregnation of the electrode with an electrolyte and increasing internal resistance of the battery. Therefore, $1^{st}$ cycle efficiency was reduced and, in addition, it was found that the cycle capacity maintenance rate was deteriorated due to resistance being maintained at a high level even during subsequent cycles.

Those skilled in the art will appreciate that various modifications and variations are possible without departing from the scope and spirit of the invention, based on the foregoing description.

The invention claimed is:
1. A slurry for an electrode, comprising:
   (a) a binder, comprising polymer particles formed by polymerization of two types or more of monomers with two types or more of cross-linking agents having different molecular weights,
   wherein said two types or more of cross-linking agents having different molecular weights comprise (1) a (meth)acrylate compound or an amine compound having at least two double-bonds at the ends thereof and a molecular weight of 50 to less than 250, and (2) a (meth)

acrylate compound having an oxyalkylene group as well as at least two double-bonds at the ends thereof, and a molecular weight of 250 to less than 5,000; and (b) an electrode active material capable of absorbing and discharging lithium.

2. The slurry according to claim 1, wherein the two types or more of monomers are a mixture of: (a) a (meth)acrylic acid ester monomer; and (b) at least one monomer selected from the group consisting of an acrylate monomer, a vinyl monomer and a nitrile monomer.

3. The slurry according to claim 2, wherein the (meth) acrylic acid ester monomer is included in an amount of 10 to 99wt. % and the monomer in Group (b) is included in an amount of 1 to 60 wt. %, relative to a total weight of the two types or more of monomers.

4. The slurry according to claim 3, wherein the (meth) acrylic acid ester monomer is at least one monomer selected from the group consisting of methyl acrylate, ethyl acrylate, propyl acrylate, isopropyl acrylate, n-butyl acrylate, isobutyl acrylate, n-amyl acrylate, isoamyl acrylate, n-ethylhexyl acrylate, 2-ethylhexyl acrylate, 2-hydroxyethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, n-ethylhexyl methacrylate, 2-ethylhexyl methacrylate, hydroxyethyl methacrylate and hydroxypropyl methacrylate.

5. The slurry according to claim 3, wherein the acrylate monomer is at least one monomer selected from the group consisting of methacryloxy ethylethyleneurea, β-carboxy ethylacrylate, aliphatic monoacrylate, dipropylene diacrylate, ditrimethylpropane tetraacrylate, hydroxyethyl acrylate, dipentaerythriol hexaacrylate, pentaerythriol triacrylate, pentaerythriol tetraacrylate, lauryl acrylate, ceryl acrylate, stearyl acrylate, lauryl methacrylate, cetyl methacrylate and stearyl methacrylate.

6. The slurry according to claim 3, wherein the nitrile monomer is at least one monomer selected from the group consisting of succinonitrile, sebaconitrile, nitrile fluoride, nitrile chloride, acrylonitrile and methacrylonitrile.

7. The slurry according to claim 2, wherein the vinyl monomer is at least one monomer selected from the group consisting of styrene, α-methyl styrene, β-methyl styrene, para-tert-butyl styrene, divinyl styrene and mixtures thereof.

8. The slurry according to claim 1, wherein the (meth) acrylate compound is at least one compound selected from the group consisting of ethylene glycol dimethacrylate, 1,3-butandiol dimethacrylate, 1,6-hexanediol dimethacrylate and aryl methacrylate (AMA).

9. The slurry according to claim 1, wherein the amine compound is at least one compound selected from the group consisting of triallyl amine (TAA) and diallyl amine (DDAA).

10. The slurry according to claim 1, wherein the (meth) acrylate compound having an oxyalkylene group is at least one compound selected from the group consisting of polyethylene glycol diacrylate, polypropylene glycol diacrylate and polybutylene glycol diacrylate.

11. The slurry according to claim 1, wherein the cross-linking agents have a content ratio by weight ranging from 1:0.1 to 1:20 (ratio of a cross-linking agent having a molecular weight of 50 to less than 250 to a cross-linking agent having a molecular weight of 250 to less than 5,000) and an amount of the cross-linking agents ranges from 0.1 to 10 wt. % relative to a total weight of the binder.

12. An electrode for a secondary battery, comprising the slurry for an electrode according to claim 1 applied to a current collector.

13. A lithium secondary battery including the electrode for a secondary battery according to claim 12.

* * * * *